Patented Aug. 30, 1949

2,480,298

UNITED STATES PATENT OFFICE 2,480,298

FLAME RETARDANT COMPOSITIONS

William Bernard Happoldt, Jr., Arlington, N. J., assignor to E. I. du Pont de Nemours & Company, Wilmington, Del., a corporation of Delaware No Drawing. Application November 24, 1948, Serial No. 61,899

6 Claims. (Cl. 260—28.5)

This invention relates to flame retardant polythene compositions and more particularly to a method for preparing normally solid polymers of ethylene which are self-extinguishing and have a high degree of flame retardance.

The art has taught various methods of flame-proofing cellulose wherein many different types of flame-proofing agents have been used to treat fabrics in order to decrease their inflammability. Among such flame-proofing agents are various phosphorus-containing compounds, boron-containing compounds, the metallic oxides such as antimony oxide, chlorinated materials such as chlorinated paraffin, and mixtures of a metallic oxide and a chlorinated material, to name but a few.

The normally solid polymers of ethylene, known and hereinafter referred to as polythene, are described by Fawcett et al. in U. S. Patent 2,153,553. These polymers are tough solids at normal temperatures with a melting point of about 212° F. to 220° F., corresponding in composition substantially to $(CH_2)_x$, and show a crystalline structure by X-ray diffraction analysis. Generally they have molecular weights in excess of 6000 measured according to the method described in U. S. Patent 2,153,553, but the viscosities of the molten polymers may vary over a considerable range provided the polymers are solid at normal temperatures.

Polythene has found widespread use in the past few years for the manufacture of wire and cable insulation and these polymers have inherently outstanding properties for this particular application. Certain chlorine-containing vinyl resins (i. e. polyvinyl chloride, copolymers of vinyl chloride and vinyl acetate, and the like) have also found widespread use as electrical insulation. However, polythene has inherently superior properties both electrically and physically to the vinyl resins for the above mentioned application. Unfortunately, polythene suffers one major fault in that it is highly inflammable which prevents its use for many applications in the home, in public gathering places, and in industry.

Many conventional flame-proofing agents for fabrics were tested in polythene in an attempt to produce a flame retardant polythene composition which would be satisfactory for wire insulation and other uses. Among the agents tested were, for example, boric acid and diammonium phosphate. Although these agents are useful for impregnating fabrics, when polythene containing either one of these agents was extruded over wire, volumes of gas were evolved, wherein the coating bubbled badly and extruded poorly, yielding a pitted surface. Obviously these two agents were unsatisfactory in polythene extruded insulation; nor could such polythene compositions be used as polythene molding compositions. Antimony trioxide and chlorinated paraffin were also tested as polythene flame-retardant materials. Neither of these latter modifiers when used alone in proportions up to 35% modifier/65% polythene produces a satisfactory polythene composition which will pass the Underwriters' Laboratories flame retardance test described in more detail hereinafter.

There has now been discovered for the first time a series of polythene compositions which will pass the Underwriters' flame retardance test by combining with polythene certain limited proportions of antimony trioxide and a solid chlorinated hydrocarbon of high chlorine content. More specifically, it has been found that the proportions of antimony trioxide and chlorinated hydrocarbon as well as the ratio of the combined weights of these two modifiers to polythene are highly critical. By this is meant that the use of these two modifiers in polythene in all proportions will not produce a polythene composition commercially satisfactory for electrical insulation. When, however, the combination of antimony trioxide and chlorinated hydrocarbon are used within certain restricted ranges recited in accordance with this invention, there results a polythene composition which is both self-extinguishing in the ASTM flammability test and also passes the Underwriters' Laboratories Inc. (hereinafter designated UL) flame retardance test decribed on page 17 of "Standards for Thermoplastic-Insulated Wires" (third edition, 1948).

An object of the present invention is to provide a polythene composition having decreased inflammability. A more specific object is to provide a polythene which is both self-extinguishing and will pass the Underwriters' Laboratories flame retardance test. A further object is to provide a method for preparing polythene compositions which meet the existing standards for acceptable electrical insulation with regard to flame retardant properties, without appreciably altering the other desirable physical and electrical properties inherent in polythene. Other objects will be apparent from the description of the invention given hereinafter.

The above objects are accomplished according to the present invention by providing a solid composition comprising an intimate mixture of at least 50% by weight of polythene, 20% to 35% by weight of antimony trioxide and at least 6% by weight of a solid chlorinated hydrocarbon containing 55% to 80% chlorine by weight, the combined amounts of antimony trioxide and the said solid chlorinated hydrocarbon being present in an amount of from 38% to 50% by weight based on the amount of polythene, antimony trioxide and chlorinated hydrocarbon present in said composition and said amounts of polythene, antimony trioxide and chlorinated hydrocarbon being based upon the combined weight of said polythene, antimony trioxide and chlorinated hydrocarbon. Preferably the invention provides a moldable and extrudable solid composition as heretofore stated wherein the solid chlorinated hydrocarbon is a chlorinated aliphatic hydrocarbon melting below 355° F. and boiling above 355° F. at atmospheric pressure. Still more specifically it is preferred to employ in the above composition, especially when used as electrical insulation on wire, a solid chlorinated aliphatic hydrocarbon having a molecular weight below 1000, a melting point below 355° F. and a boiling point above 355° F. at atmospheric pressure, and containing from 65% to 75% chlorine by weight.

The compositions of this invention may be prepared by mixing the antimony trioxide and solid chlorinated hydrocarbon together with the polythene by any known method provided the final composition is homogeneous. Erratic results may be obtained especially in the UL flame retardance test if the composition has not been thoroughly blended to give an intimate mixture of the essential solid ingredients. Conventional methods of compounding the ingredients include working them together on heated rolls, masticating the ingredients in a heated Banbury mixer, and working the ingredients together by means of a screw such as in a plasticator. Preferably the components are blended together at a temperature above the melting point of the polythene, the blending temperature in most cases being in the range of 230° F. to 270° F. After a uniform blend is obtained, the composition may be sheeted out on hot rolls and then cut in a cube cutter or in a Ball and Jewell cutter or the like into small particles of any desired granule size and shape.

The temperature used in compounding the compositions of this invention as well as that used in molding and extruding the compositions into useful articles should be above the melting point of the polythene. This will enable the production of homogeneous compositions which can be fabricated into finished articles having the best surface appearance as well as accomplishing the said production at economically feasible processing cycles. However, caution should be observed so as not to raise the temperature of the compositions high enough to decompose the solid chlorinated hydrocarbon. The upper temperature limit permissible depends of course upon the decomposition temperature of the particular chlorinated hydrocarbon employed and upon whether or not a thermal stabilizer is present in the composition. For example, with unstabilized chlorinated paraffin a batch temperature above 300° F. will cause some decomposition, which results in discoloring of the resulting polythene composition. Thus extrusion and molding temperatures in the range of 270-290° F. are recommended for short cycles when employing unstabilized chlorinated paraffin. If a thermal stabilizer for the chlorinated paraffin is present, the working and fabricating temperature of the batch may be raised above 300° F., the latitude permitted depending on the efficacy of the stabilizer employed.

The following examples, in which all parts are by weight unless otherwise specified, illustrate specific embodiments of the invention and are in no manner to be construed as limiting the subject invention.

EXAMPLE I 57 parts of polythene having a molecular weight of from 18,000–20,000 and containing 0.2% by weight of an anti-oxidant, 28 parts of antimony trioxide and 15 parts of chlorinated paraffin containing 70% by weight of chlorine were mixed in a Banbury mixer at 250° F. until a homogeneous blend was obtained. The composition was then sheeted out and cut in a Ball and Jelwell cutter to $\tfrac{5}{16}$ inch granular molding powder. Part of the molding powder was fed to a conventional plastics extruder and the composition extruded onto No. 14 A. W. G. single strand copper wire to give a finished coating 0.128 inch thick at a rate of 50 feet per minute. The oil temperature of the cylinder in the extrusion machine was maintained at 325° F. and the stock temperature during extrusion was 290° F. The composition extruded without any difficulty and the resulting coating was smooth and free of bubbles and other imperfections. The UL flame test on this coated wire showed a flame retardance rating of 4 and the UL cold flex temperature test (as described on page 11 of the aforementioned UL "Standards") showed no break at —103° F. Another sample of the molding powder was compression molded into sheets 0.060 inch thick and tests on these sheets showed this composition to have the following properties:

ASTM flammability (ASTM D635–44) _____ Self-extinguishing
Dielectric constant, $10^6$ c. p. s. (ASTM D150–47T) _____ 2.7
Power factor, $10^6$ c. p. s. (ASTM D150–47T) _____ 0.002
Volume resistivity, ohm-cm. (ASTM D–257–46) _____ Greater than $10^{14}$

EXAMPLE II 0.5 part of blue pigment was incorporated with the ingredients of Example I in the Banbury mixer. The batch was mixed, extruded on wire and compression molded into sheets in the same manner as described in Example I. The resulting fabricated articles were blue in color, manifested a flame retardance rating of 4, showed a volume resistivity of $10^{14}$ ohm-cm., and other properties similar to those of the composition in Example I.

EXAMPLE III 52 parts of polythene having a molecular weight of from 18,000–20,000, 26 parts of antimony trioxide, and 22 parts of chlorinated paraffin having 70% by weight chlorine and containing 2% by weight of a heat stabilizer were compounded and extruded on wire as described in Example I. The wire coating was smooth and free from imperfections. The UL flame test showed a flame retardance rating for this composition on wire of 4.

EXAMPLE IV 57.6 parts of polythene having a molecular weight of from 18,000–20,000 and containing 0.2% by weight of an antioxidant, 28.3 parts of antimony trioxide, and 14.1 parts of "Aroclor" 1270 which is a solid mixture of chlorinated diphenyls containing 70% chlorine were compounded and extruded on wire as described in Example I. The flame retardance rating of the wire coating was 4.

The UL flame retardance of the compositions in the examples was determined according to the Underwriters' Laboratories specifications referred to herein. In this test an insulated wire is subjected to a 15 second application of flame followed by a 15 second period with the flame turned off. This application is repeated five times. Five samples of each wire are tested. According to the test the wire must not burn beyond a specified point during the test or burn more than one minute after the final application of flame. For evaluating the compositions of this invention the flame retardance has been given a numerical rating (designated F. R.) according to the following schedule:

| UL Flame Retardance Test | F. R. |
|---|---|
| Compositions which fail completely | 1 |
| Compositions which fail in some cases but pass in others | 2 |
| Compositions which pass in all cases but which merely pass the test | 3 |
| Compositions which pass by wide margin | 4 |

It has been established that the limitation on the proportions of antimony trioxide and solid chlorinated hydrocarbon in the compositions of this invention may be expressed most conveniently by the following equation:

Flame retardance rating = $0.000232 \, [(\% \text{ chlorinated hydrocarbon})(\% \text{ antimony trioxide})^2] + 0.837$.

The above equation is known as a multiple regression equation and was derived from the observed flame retardance ratings of many compositions falling within and without the limits specified for the compositions of this invention. The table below shows the flame ratings both observed and calculated from the equation for several polythene compositions containing varying proportions of antimony trioxide and a solid chlorinated hydrocarbon. Naturally the most desirable (i. e. least inflammable) compositions will have the maximum flame retardance rating. It has been found that amounts of antimony trioxide as high as 40% cannot be tolerated in these polythene compositions since the cold brittleness temperature of the composition rises rapidly in this range with increasing quantities of antimony trioxide and use of this modifier in proportions greater than 40% yields a composition having a cold brittleness temperature higher than 32° F., which is unacceptable for most electrical insulating applications. Also it has been found that 35% of either modifier when used alone in polythene results in a composition that is inflammable (i. e. fails the UL flame test). Based on the flame test data of the table below it may be observed that the borderline compositions with regard to passing the UL flame test fall approximately at a minimum calculated flame rating of 2.5. Substituting this value in the equation for various proportions of the two modifiers, one may readily determine that the proportion of antimony trioxide in the composition may vary only within the limits of 20% to 35%, the proportion of solid chlorinated hydrocarbon must be at least 6%, and the combined proportion of the two modifiers must lie between 38% and 50%. The data in the table are based on using a solid chlorinated hydrocarbon containing approximately 70% chlorine by weight. The chlorinated hydrocarbons containing less than 55% chlorine yield compositions which do not possess sufficient flame retardant properties, whereas the physical properties of compositions based on chlorinated hydrocarbons containing above 80% chlorine are not as desirable as those containing between 55% and 80%. Those chlorinated hydrocarbons containing from 65% to 75% chlorine are preferred.

Table

| Calculated F. R. from equation | Observed F. R. | Percent Polythene | Percent Combined modifiers | Percent Sb₂O₃ | Percent Chlorinated hydrocarbon¹ |
|---|---|---|---|---|---|
| 2.695 | 3 | 60 | 40 | 20 | 20 |
| 3.619 | 4 | 50 | 50 | 20 | 30 |
| 5.100 | 4 | 50 | 50 | 35 | 15 |
| 2.508 | 3 | 62 | 38 | 20 | 18 |
| 4.461 | 4 | 50 | 50 | 25 | 25 |
| 2.229 | 2 | 65 | 35 | 20 | 15 |
| 2.542 | 3 | 59 | 41 | 35 | 6 |
| 1.881 | 1 | 65 | 35 | 30 | 5 |
| 3.567 | 4 | 57 | 43 | 28 | 15 |
| 4.287 | 4 | 52 | 48 | 26 | 22 |
| 0.837 | 1 | 65 | 35 | 0 | 35 |
| 0.837 | 1 | 65 | 35 | 35 | 0 |
| 1.117 | 1 | 62.5 | 37.5 | 6.2 | 31.3 |
| 3.455 | 4 | 57.6 | 42.4 | 28.3 | ²14.1 |

¹ The chlorinated hydrocarbon in the table is chlorinated paraffin containing 70% chlorine in all cases except in the case of "Aroclor" 1270 which is a solid mixture of chlorinated diphenyls containing 70% by weight chlorine.
² "Aroclor" 1270.

The chlorinated hydrocarbons for use in this invention must be in the solid state at normal atmospheric conditions and must contain high proportions of chlorine, that is, from 55% to 80% chlorine by weight, and preferably 65% to 75%, in order to yield compositions which possess satisfactory flame retardance and other properties for fulfilling the objects of this invention. By "solid chlorinated hydrocarbon" is meant any hydrocarbon containing chlorine atoms substituted for hydrogen atoms to the extent of from 55% to 80% of the total weight of the chlorinated hydrocarbon regardless of how said chlorine is introduced into the molecule. Thus, within the purview of this invention are the compounds having substantially linear aliphatic hydrocarbon chains containing chlorine substituents, the aromatic hydrocarbon nuclei containing chlorine substituents, and the mixed aliphatic-aromatic hydrocarbons containing chlorine substituents in the chain and/or nucleus. Examples of these different types of solid chlorinated hydrocarbons are chlorinated paraffin, chlorinated propanes, chlorinated propylenes, hexachloroethane, chlorinated polythene, chlorinated polyisobutylene, polyvinyl chloride, polyvinylidene chloride, after-chlorinated polyvinyl chloride; chlorinated polyphenyls, chlorinated naphthalenes, hexachlorobenzene, chlorinated indenes; chlorinated polystyrenes, chlorinated diphenyl alkanes, and the like. Since these chlorinated hydrocarbons differ in physical properties, certain ones are preferred for use in this invention. The chlorinated aliphatic hydrocarbons are more compatible with polythene and generally have lower melting points than the chlorinated aromatic hydrocarbons and for these reasons the former group are preferred over the latter. The chlorinated aromatic hydrocarbons usually have melting points higher than the temperatures normally encountered in processing polythene and hence these compounds appear to be dispersed as a filler in the polythene. For use as extruded electrical insulation the solid chlorinated aliphatic hydrocarbons of relatively low molecular weight, (i. e., below 1000) melting below 355° F., and boiling above 355° F. at atmospheric pressure (e. g., the chlorinated paraffins) are particularly preferred, since the members of this group may be fused together with the polythene in compounding and they have a low melt viscosity at the temperature of extrusion of the polythene compositions thereby facilitating, in fact, increasing the rate of extrusion of the polythene composition without loss by evaporation, and they have the least adverse effect on the desirable inherent properties of polythene. On the other hand the relatively high molecular weight (above 1000) chlorinated aliphatic hydrocarbons (e. g., chlorinated polythene, polyvinyl chloride) have poor low temperature brittleness which is undesirable for wire insulation and high stiffness and high melt viscosity which decreases and impairs extrusion of the polythene compositions containing these compounds. Despite the disadvantages listed when used for extruded insulation, these high molecular weight chlorinated aliphatic compounds fulfill the requirements for flame retardance when employed in the compositions of this invention, which is the primary object of the invention, and may be used in other than extrusion applications, for example as injection molded articles.

It is to be emphasized that all chlorinated hydrocarbons mentioned for use in this invention should be in the solid state at normal atmospheric temperatures.

The antimony trioxide should be used in finely divided form in order to obtain the most homogeneous compositions; e. g., that employed in the above examples passed a U. S. Standard Sieve No. 200.

The compositions of the present invention essentially consist of polythene, antimony trioxide, and a solid chlorinated hydrocarbon but small amounts of other materials are not excluded. These other materials include fillers such as clay, pigments such as carbon blacks and the phthalocyanines, anti-oxidants and stabilizers for either or both the polythene and the chlorinated hydrocarbon (e. g., phenoxypropylene oxide, glycidyl laurate, diphenyl paraphenylenediamine, dibeta-naphthyl paraphenylene diamine, phenyl alpha-naphthylamine, phenyl beta - naphthylamine, phenyl salicylate, propyl gallate, menthyl phenol, octyl phenol, diorthocresylol propane, diphenylol propane, calcium carbonate, lead salts and the like), lubricants (e. g., aluminum stearate, zinc stearate, calcium stearate, zinc oleate, paraffin and microcrystalline waxes, and the like), and other resinous materials, in order to modify the properties of the composition for a particular application. However the addition of such materials should be made in small proportions, usually not greater than 10% of the combined weights of polythene, antimony trioxide and chlorinated hydrocarbon. In any case the proportion of the other materials must not be so high that they offset the advantages to be gained from the particular combination of polythene, antimony trioxide and chlorinated hydrocarbon and of course should not appreciably if at all reduce the flame retardance of the composition. These additional ingredients may be incorporated in the composition at the same time the main components are being mixed, that is by rolling on a mill, mixing in a Banbury mixer, plasticating, or if desired by solvent mixing with subsequent evaporation of the solvent.

The chief advantage of the compositions of this invention is the fact that they provide a new solid electrical insulation which is at the same time self-extinguishing and passes the high standards for flame retardance set by Underwriters' Laboratories without the excessive dripping which occurs when unmodified polythene is placed in a flame, while still retaining good low temperature toughness in addition to the other excellent physical and electrical properties of unmodified polythene. Heretofore polyvinyl chloride and certain vinyl chloride copolymers containing high proportions of vinyl chloride have been the only commercially available compositions which possess satisfactory flame retardance together with other properties required for electrical insulation. Since various local as well as national specifications and ordinances have recently required the use of self-extinguishing and other flame retardant compositions for the fabrication of articles to be used in the home as well as in public gathering places, it has become mandatory to eliminate the use of synthetic materials not possessing satisfactory flame retardance but which otherwise have satisfactory properties for a particular application. The compositions of the present invention in many respects are superior to the vinyl chloride polymers and copolymers heretofore used for electrical insulation, this superiority being based on standard ASTM tests for cold brittleness temperature, power factor, dielectric constant, volume resistivity, and UL cold flex temperature of a wire coating, and in addition these compositions possess satisfactory flame retardance to pass the UL flame test and to be classed self-extinguishing in the ASTM flammability test. Further, the compositions of this invention may be extruded onto wire at commercially feasible rates, for example the composition of Example I may be extruded over a No. 22 A. W. G. wire to give a coating 0.015 inch thick at a rate of 600 feet per minute.

The instant compositions are especially useful for insulating wires and cables for use at both low and high frequencies, such as shipboard cables, television lead-in wires, bus bar insulation, and the like. In fact these compositions eliminate the need for the special cable constructions previously used where it was necessary to cover a polythene insulated wire with a vinyl chloride polymer or copolymer jacket in order to produce a completed cable which was fire retardant. The use of these compositions is not limited to the wire insulation field since the compositions may also be compression or injection molded into various articles such as household electrical plugs, radio tube sockets, bases, grommets, coil forms, high voltage bushings, cases for coils and transformers, and many other articles. Additional uses include cable and transformer potting compounds which may possess a wide range of melt viscosities depending upon the melt viscosity of the polythene used in the composition and the proportion of wax which may be added to the composition to regulate the viscosity. In fact the compositions of this invention may be used in any other applications where a high degree of flame retardance is required in combination with the excellent physical and electrical properties of polythene.

As many apparently widely different embodiments of this invention may be made without departing from the spirit and scope thereof, it is to be understood that the invention is not limited to the specific embodiments thereof except as defined in the appended claims.

I claim:

1. A composition of matter comprising at least 50 per cent by weight of solid polythene, 20 per cent to 35 per cent by weight of antimony trioxide and at least 6 per cent by weight of a solid chlorinated hydrocarbon, the said chlorinated hydrocarbon containing from 55 per cent to 80 per cent by weight of chlorine; the combined weight of antimony trioxide and the said solid chlorinated hydrocarbon being present in an amount of between 38 per cent to 50 per cent by weight based on the combined weight of polythene, antimony trioxide and chlorinated hydrocarbon present in said composition and said proportions of polythene, antimony trioxide and chlorinated hydrocarbon being based on the combined weight of polythene, antimony trioxide and chlorinated hydrocarbon present in said composition.

2. A composition of matter comprising at least 50 per cent by weight of solid polythene, 20 per cent to 35 per cent by weight of antimony trioxide and at least 6 per cent by weight of a solid chlorinated aliphatic hydrocarbon containing from 55 per cent to 80 per cent by weight chlorine and the said chlorinated hydrocarbon having a melting point below 355° F. and a boiling point above 355° F. at atmospheric pressure; the combined weight of antimony trioxide and the said solid chlorinated aliphatic hydrocarbon being present in an amount of between 38 per cent to 50 per cent by weight based on the combined weight of polythene, antimony trioxide and chlorinated hydrocarbon present in said composition and the said proportions of polythene, antimony trioxide and solid chlorinated aliphatic hydrocarbon being based on the combined weight of polythene, antimony trioxide and said chlorinated hydrocarbon present in said composition.

3. A composition of matter comprising at least 50 per cent by weight of solid polythene, 20 per cent to 35 per cent by weight of antimony trioxide and at least 6 per cent by weight of a solid chlorinated aliphatic hydrocarbon containing from 65 per cent to 75 per cent by weight of chlorine and the said solid chlorinated aliphatic hydrocarbon having a molecular weight below 1000, a melting point below 355° F. and a boiling point above 355° F. at atmospheric pressure; the combined weight of antimony trioxide and the said solid chlorinated aliphatic hydrocarbon being present in an amount of between 38 per cent to 50 per cent by weight based on the combined weight of polythene, antimony trioxide and chlorinated hydrocarbon present in said composition and the said proportions of polythene, antimony trioxide and solid chlorinated aliphatic hydrocarbon being based on the combined weight of polythene, antimony trioxide and said chlorinated hydrocarbon present in said composition.

4. A composition of matter comprising at least 50 per cent by weight of solid polythene, 20 per cent to 35 per cent by weight of antimony trioxide and at least 6 per cent by weight of a solid chlorinated paraffin containing from 65 per cent to 75 per cent by weight of chlorine and the said solid chlorinated paraffin having a molecular weight below 1000, a melting point below 355° F. and a boiling point above 355° F. at atmospheric pressure; the combined weight of antimony trioxide and the said chlorinated paraffin being present in an amount of between 38 per cent to 50 per cent by weight based on the combined weight of polythene, antimony trioxide and chlorinated paraffin present in said composition and the said proportions of polythene, antimony trioxide and chlorinated paraffin being based on the combined weight of polythene, antimony trioxide and said chlorinated paraffin present in said composition.

5. An insulated electrical wire conductor wherein the insulation is a composition comprising at least 50 per cent by weight of solid polythene, 20 per cent to 35 per cent by weight of antimony trioxide and at least 6 per cent by weight of a solid chlorinated paraffin containing from 65 per cent to 75 per cent by weight of chlorine and the said solid chlorinated paraffin having a molecular weight below 1000, a melting point below 355° F. and a boiling point above 355° F. at atmospheric pressure; the combined weight of antimony trioxide and the said chlorinated paraffin being present in an amount of between 38 per cent to 50 per cent by weight based on the combined weight of polythene, antimony trioxide and chlorinated paraffin present in said composition and the said proportions of polythene, antimony trioxide and chlorinated paraffin being based on the combined weight of polythene, antimony trioxide and said chlorinated paraffin present in said composition.

6. A composition of matter essentially comprising, by weight, 57 parts of solid polythene, 28 parts of antimony trioxide, and 15 parts of a solid chlorinated paraffin containing approximately 70% by weight of chlorine.

WILLIAM BERNARD HAPPOLDT, Jr.

REFERENCES CITED

The following references are of record in the file of this patent:

UNITED STATES PATENTS

| Number | Name | Date |
| --- | --- | --- |
| 2,453,644 | Steinkraus | Nov. 9, 1948 |

OTHER REFERENCES

Page 526, Industrial and Engineering Chemistry, vol. 37, June 1945.